(No Model.)

A. NIMMO.
CALIPERS.

No. 280,073. Patented June 26, 1883.

WITNESSES:
Theo. G. Hoster
C. Sedgwick

INVENTOR:
A. Nimmo
BY Munn & Co
ATTORNEYS.

UNITED STATES PATENT OFFICE.

ANDREW NIMMO, OF BRISTOL, RHODE ISLAND.

CALIPERS.

SPECIFICATION forming part of Letters Patent No. 280,073, dated June 26, 1883.

Application filed November 4, 1882. (No model.)

*To all whom it may concern:*

Be it known that I, ANDREW NIMMO, of Bristol, in the county of Bristol and State of Rhode Island, have invented new and Improved Calipers, of which the following is a full, clear, and exact description.

The object of my invention is to provide new and improved calipers for ascertaining the circumference, area, and weight of bars, rods, balls, &c.

The invention consists in calipers formed with two curved pieces, which are pivoted to each other, and are provided at their free ends with shanks, the inner edges of which are in radial lines drawn from the center of the pivot uniting the two curved pieces. If the diameter of a rod or bar is taken between the base ends of the shanks, the points of the shanks will show the circumference, or fractions thereof, of the said rod or bar. The said calipers can also be used to ascertain the weight of bars, rods, tubes, &c., in a manner that will be fully described hereinafter.

Reference is to be had to the accompanying drawings, forming part of this specification, in which similar letters of reference indicate corresponding parts in all the figures.

Figure 1:
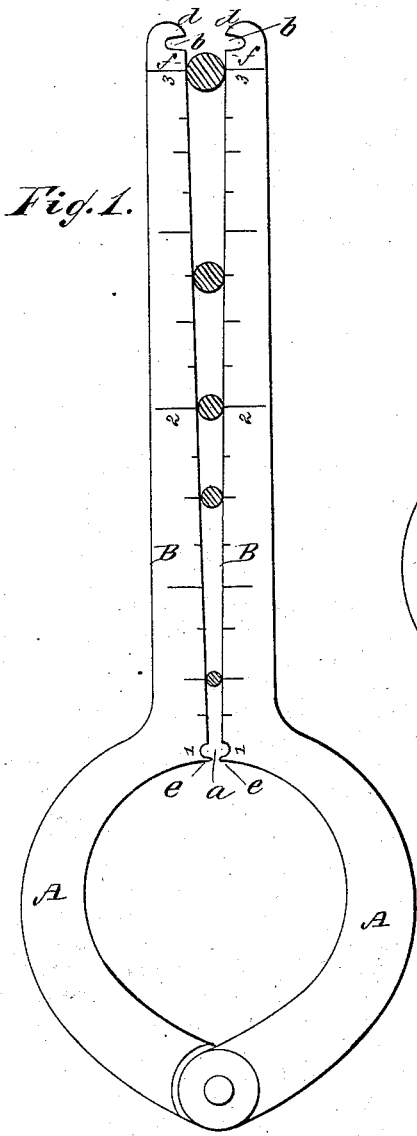
Figure 3:
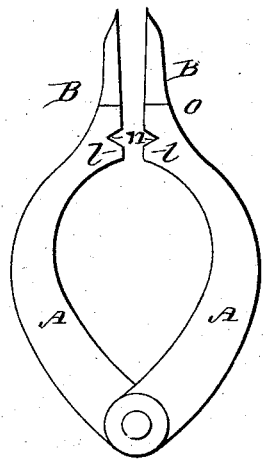
Figure 2:
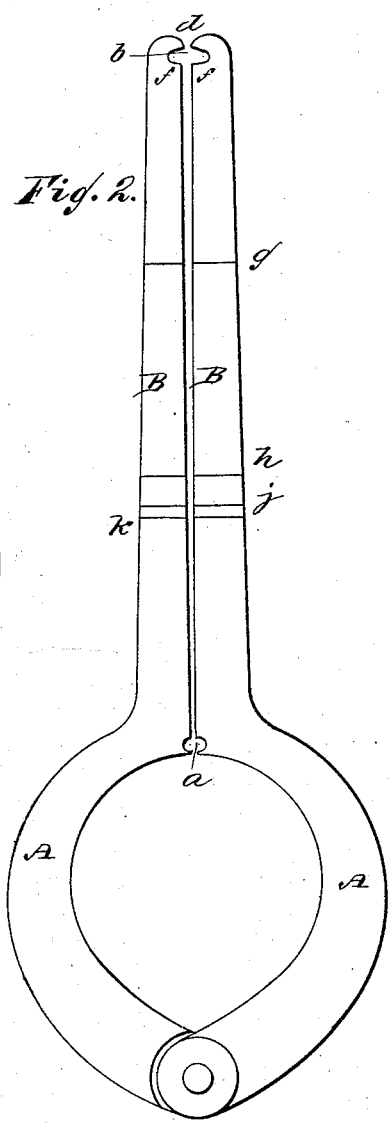
Figure 4:
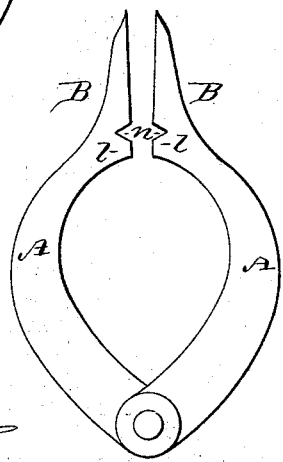

Figure 1 is a longitudinal elevation of my improved calipers for ascertaining the circumference, area, weight, &c., of rods, bars, balls, &c. Fig. 2 is a longitudinal elevation of the other side of the same. Figs. 3 and 4 are longitudinal elevations of modifications.

The calipers are formed of two semicircular or segmental pieces, A, which are pivoted to each other, so that they can swing in parallel planes, in the same manner as ordinary calipers. On the free ends of the pieces A shanks B are formed, which have a greater or less length, the inner or adjoining edges of the said shanks being on radial lines from the center of the pivot by which the two pieces A are pivoted to each other. Notches $a$ are formed in the inner edges of the shanks B, Fig. 1, at the base ends of the same, and notches $b$ are formed in the inner edges of the shanks B, at the upper ends. The outer prongs, $d$, formed by the notches $b$, indicate the circumference of bars, &c., the diameter of which is taken between the shanks at the lower prongs, $e$, and the corners $f$, formed by the notches $b$, are used to measure the weight of bars, rods, &c., of cast-iron. The shanks are provided with a scale, which is to be used as a gage for rods, bars, &c., to measure the diameter of the same, and for the purpose of ascertaining the area in square inches of a cross-section of rectangular bars. For instance, if one dimension of a rectangular bar be taken between the points $e\ e$, the distance between the shanks at the points of the scales on the same, marking the other dimension, will be the number of square inches in or area of the cross-section of the bar. On the opposite sides the shanks are provided with marks $g\ h\ j\ k$, which indicate the locations for taking the measurements for ascertaining the weights of lead, cast-brass, steel, and wrought-iron, respectively.

The calipers shown in Figs. 3 and 4 have short tapering shanks, each of which has a V-shaped notch, $n$, in its inner edge, near the base, which notch has its sides at an angle of sixty degrees, so that the notch can be used as a gage for grinding the edges on tools, for threading screws, &c. The ends of the shanks of the calipers shown in Fig. 4 are rounded and pointed, and the ends of the shanks of the calipers shown in Fig. 3 are flattened and pointed, and are provided with a transverse mark, $o$, which shows three-eighths circumference of a bar or rod held between the bases of the shanks. At the ends of the shanks one-half circumference is shown, and at the lower corners, $l$, formed by the notches $n$ one-third circumference is shown. Other marks, as at $o$, will be provided, as may be required, for showing other fractions of circumference.

The calipers are used in the following manner: If the circumference of a rod is to be obtained by means of the calipers shown in Figs. 1 and 2, the diameter of the rod is taken between the prongs $e\ e$, and the distance between the prongs $d\ d$ will be equal to the circumference. The distance between the corners $f\ f$ will indicate the weight per half linear foot of cast-iron. The distance between the inner edges at the lines $g\ h\ j\ k$ indicates the weight per half linear foot of lead, cast-brass, steel, or wrought-iron, respectively. The calipers shown in Fig. 3 can be used for ascertaining one-third, three-eighths, and one-half circumferences, and corresponding parts of the area of a rod the diameter of which is taken between the bases of the shanks. The calipers shown in Fig. 4 can be used for ascertaining one-third and one-half circumferences. If the diameter of a ball be taken between the shanks of the calipers shown in Figs. 3 and 4, at the base of the same, one-third of the circumference of the ball is obtained. That is multiplied with the radius and then with the diameter, and the cubical contents of the ball is then obtained. The weight of a certain length of tubing can also be ascertained by means of this instrument, by first ascertaining the weight of a solid cylinder of the length of the tubing, and then ascertaining the weight of a solid cylinder of the size of the opening in the tube, and then subtracting the latter amount from the former. The pressure on a piston, the quantity of steam in a cylinder, &c., can easily be computed by means of the calipers.

Having thus described my invention, what I claim as new, and desire to secure by Letters Patent, is—

1. Calipers made substantially as herein shown and described, and consisting of two curved pieces hinged to each other, and provided with shanks projecting from the free ends of the curved pieces, the inner edges of the said shanks being on radial lines from the center of the pivot uniting the two curved pieces, as set forth.

2. Calipers formed of two curved pieces pivoted to each other, and provided with shanks having notches in their inner edges, near their base, substantially as herein shown and described.

3. Calipers formed of two curved pieces pivoted to each other, and provided with shanks having notches in their inner edges near their bases, and one or more marks on their sides, substantially as herein shown and described.

4. Calipers formed with two curved pieces, A, pivoted to each other, and having shanks B at their free ends, which shanks are provided at their outer ends with notches $b$ and at their base ends with notches $a$, substantially as herein shown and described, and for the purpose set forth.

5. Calipers made substantially as herein shown and described, and consisting of two curved pieces, A, pivoted to each other, and provided at the free ends with shanks B, which are provided with the marks $g\ h\ j\ k$, substantially as herein shown and described, and for the purpose set forth.

6. Calipers formed of two curved pieces, A, pivoted to each other, and provided at the free ends with shanks B, having a graduated scale on one side and the marks $g\ h\ j\ k$ on the opposite side, substantially as herein shown and described, and for the purpose set forth.

7. Calipers made substantially as herein shown and described, and consisting of two curved pieces hinged to each other, and provided with shanks projecting from the free ends of the curved pieces, the inner edges of the said shanks being on radial lines from the center of the uniting-pivot, said shanks being provided with scales for ascertaining the weights and measurements of bars, rods, &c., from the diameter and cross-sectional measurements of said bars, &c., substantially as set forth.

ANDREW NIMMO.

Witnesses:
JOHN JOHNSON,
JAMES KERSHAW.